Jan. 12, 1954         F. L. SCHNEIDER ET AL         2,665,449
                         SHRIMP DEVEINER
                       Filed May 31, 1951
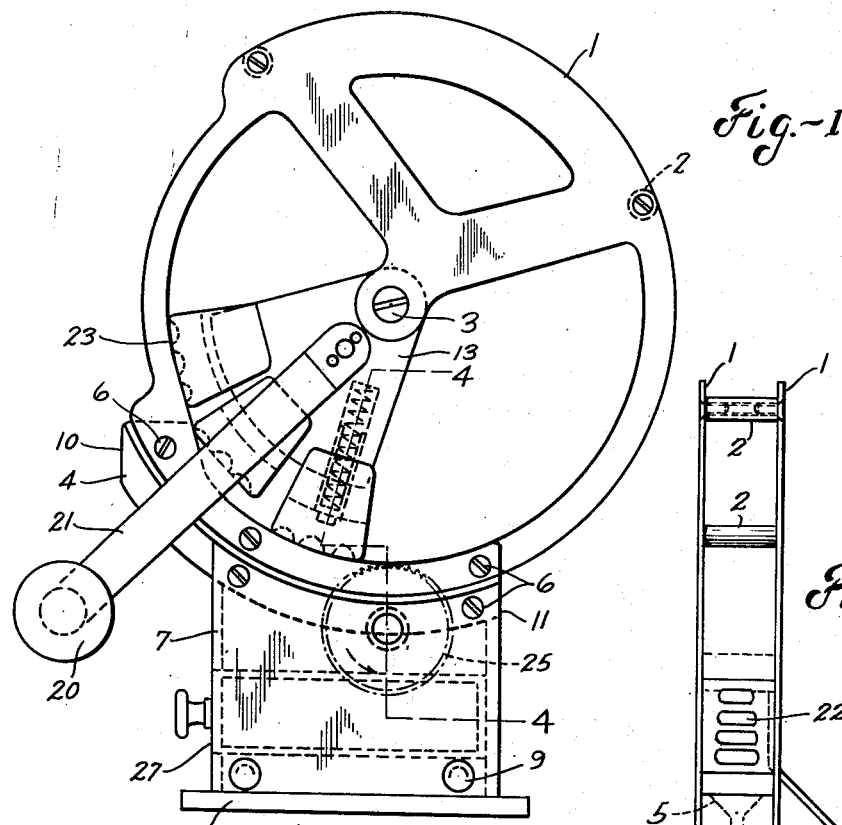
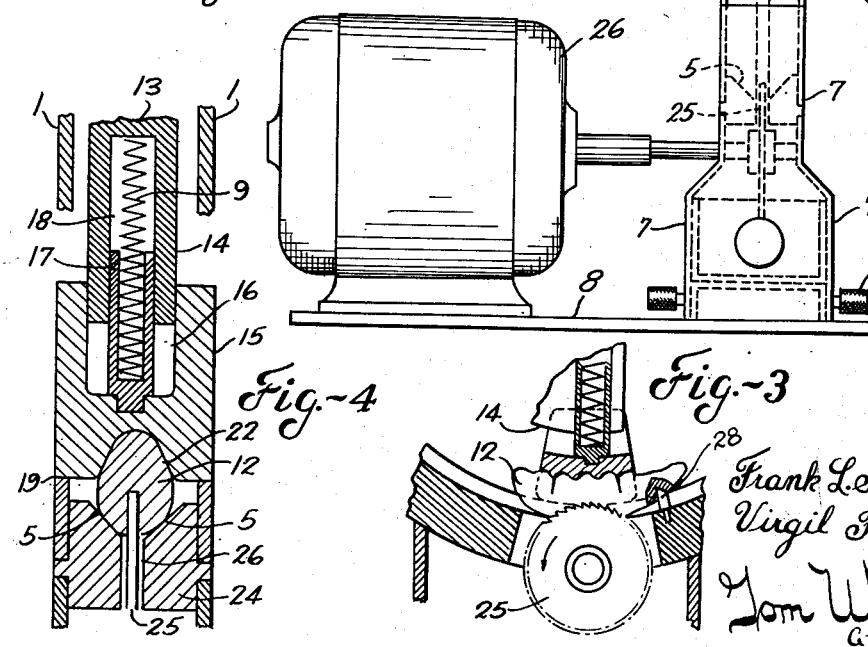
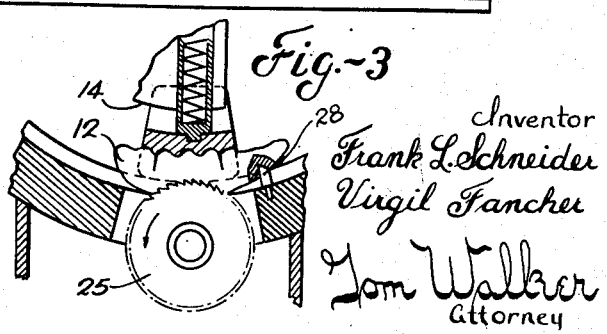
Inventor
Frank L. Schneider
Virgil Fancher
Tom Walker
Attorney Patented Jan. 12, 1954

2,665,449

UNITED STATES PATENT OFFICE 2,665,449

SHRIMP DEVEINER

Frank L. Schneider and Virgil Fancher,
Dayton, Ohio

Application May 31, 1951, Serial No. 229,138

14 Claims. (Cl. 17—2)

Our invention relates to a shrimp deveiner for use in restaurants and hotels for rapidly splitting the shell and removing the sand vein from the back of fresh shrimp.

While shrimp deveiners are commonly used in seafood markets and in some instances in large restaurants, the usual type is a very complicated and cumbersome machine, which is difficult to keep clean, and this, of course, is necessary for a device of this type.

It is an object of our invention to provide a shrimp deveiner which is relatively small and portable and easily operated by a single person for a relatively short length of time, and which then may be easily disassembled and cleaned so as to be ready for later use.

It is a further object of our invention to provide a shrimp deveiner which deveins one shrimp at a time, thus eliminating the cost and upkeep of complicated machinery incident to feeding a plurality of shrimp from a hopper into a deveiner.

It is a further object of our invention to provide a deveiner wherein the shrimp is fed across the revolving deveining saw by means of a simple hand operated crank without any danger to the operator at any time.

It is a further object of our invention to provide a shrimp deveiner having all of the above advantages which is easy to operate and requires very little, if any, training on the part of the person operating the device.

It is a further object of our invention to provide a shrimp deveiner which is relatively inexpensive to manufacture and sell, but which rapidly and efficiently will devein a single shrimp of different relative sizes, without the necessity of the operator handling the shrimp during the actual deveining action and thus eliminating the necessity of placing the fingers near the revolving deveining saw.

These and other objects of our invention which will be set forth hereinafter or will be apparent to one skilled in the art upon reading these specifications, we accomplish by that certain construction and arrangement of parts of which we shall now describe an exemplary embodiment.

Reference is now made to the drawings which form a part thereof, and in which:

Figure 1 is a side elevation of our shrimp deveiner.

Figure 2 is an end elevation of our novel shrimp deveiner taken from the left side of Figure 1.

Figure 3 is a fragmentary view similar to Figure 1 with the cover removed.

Figure 4 is a cross section taken on the section line 4—4 of Figure 1.

Briefly, in the practice of our invention, we provide spaced circular frames which mount a pivot shaft at their centers. A portion of the periphery of the frames embrace an arcuate shrimp receiving track which is channeled in cross section. The shrimp receiving track is also embraced by a framework which supports the shrimp deveiner on a base. A rotating deveining saw is positioned below the shrimp track with its periphery projecting up into the bottom portion of the track and in the path of a shrimp moved along the track.

We provide a shrimp carrier comprising moving blocks which are mounted on a plate journaled to the central pivot held by the frames. These blocks straddle the plate and are urged by springs against the arcuate shrimp receiving track. The face of the blocks carry deep grooves which, in conjunction with the channeling of the track, form a shrimp receiving pocket which tightly holds a shrimp with its back in the channel of the track, so as the shrimp is moved along the track, the sand vein running the length of the shrimp's back will come in contact with and be removed by the rotating deveining saw.

The shrimp receiving track is opened at both ends, so a shrimp may be inserted in the receiving end and discharged at the opposite end. In order to permit the insertion of a shrimp carrier comprising the between the track and the shrimp moving blocks, we provide a cam or second track above the shrimp loading end of the shrimp receiving track which lifts the blocks away from the shrimp receiving track, thus enlarging the pocket formed by the blocks in the track and permitting the easy insertion of a shrimp. The blocks normally ride along the shrimp receiving track excepting when they are urged upwardly at the forward or shrimp receiving end of the track.

The blocks are moved along the track by means of a handle which is fastened to the block holding plate and which projects through an aperture in the spaced circular frames. Thus, the actual moving of the shrimp along the track is done manually as is the loading of the shrimp onto the track. In the preferred embodiment, we provide a drawer beneath the track and the deveining saw which catches the sand veins and portions of the shrimp removed by the deveining saw. The drawer may be easily removed and replaced at will. The whole device is self-sustaining in that the lower framework holds the track, which in turn holds the circular frames which support at their center the block carrying plate.

The motor for driving the shrimp deveining saw is preferably outside of the device itself so that the deveiner may be easily removed from the common base which supports the motor along with the deveiner and easily cleaned.

Referring to the drawings, there is provided spaced frames 1 which are held apart by studs 2. A central pivot shaft 3 is mounted at the center of the frames 1. The frames 1 are preferably cut out as shown in Figure 1 so as to reduce their weight and to permit easy cleaning.

The spaced frames 1 are mounted on an arcuate shrimp receiving track 4 which is channel shaped in cross section as shown at 5 in Figures 2 and 4. The frames 1 embrace the track 4 as shown in Figure 1 and are held thereto by bolts 6. Thus the track 4 supports the frames 1.

Supporting the track 4 is a framework including spaced plates 7 which embrace the track 4 and preferably abut the periphery of the frames 1. The plates 7 are mounted on a base plate 8 preferably by pins 9, so the plates 7, the track 4 and the frames 1 may be easily removed from the base 8 for cleaning. The track 4 is opened at the shrimp receiving end 10 and at the shrimp discharging end 11 so that a shrimp 12 may be inserted onto the track and discharged from the track. Mounted on the central pivot shaft 3 is a triangularly shaped plate 13 which terminates in an arcuate edge 14. Mounted on the edge 14 is a shrimp carrier comprising the blocks 15. The blocks 15 are channeled as at 16 and embrace the periphery 14 of the plate 13. A hollow stud 17 is affixed to the base of the channel 16 in the blocks 15 and projects into a hole 18 in the plate 13. A helical coil spring 19 is positioned within the stud 17 and the hole 18 so as to resiliently urge the blocks 15 away from the plate 13 in a radial direction. The faces 19 of the blocks 15 normally rest against the track 4.

In order to move the blocks 15 along the track 5, a handle 20 mounted on an arm 21 is affixed to the plate 3. The arm 21 projects through the framework 1 so that the handle 20 is positioned well outside of the framework 1. By movement of the handle 20, the plate 13 is rotated, which in turn revolves the carrier blocks 15 and forces them to ride along the track 4.

The faces 19 of the blocks 15 are grooved as at 22 so as to form with the channel 5 a shrimp pocket for the reception of a shrimp 12. The grooves 22 in succeeding blocks 15 are of different depths so that the resulting pocket formed by the multiple blocks 15 conforms to the shape of a shrimp and insures the correct positioning of the shrimp 12 in its movement along the channel 5 of the track 4. If the shrimp being cleaned is of large size all three blocks 15 will be brought into engagement therewith, the three blocks 15 operating as a unit to form a carrier for the shrimp to advance it through the track 4. Should the shrimp being cleaned be of small or medium size, probably only one or two of the blocks 15 engage the shrimp in its passage through the track, the remaining block 15 of the carrier riding idly on track 4. The grooves 22 in the faces of the carrier blocks 15 are so formed in succeeding blocks that effective gripping action is achieved regardless of shrimp size, the shrimp being variously positioned within the extent of the carrier blocks 15 depending upon its size.

In order to permit the insertion of a shrimp between the blocks 15 and the track 4 and within the pocket, there is provided means for lifting the blocks 15 from the track 4 at the shrimp loading end 10 of the track. This consists of a cam or second track 23 which is preferably formed by a portion of the frames 1 and which is positioned at the loading end 10 of the track 4. This second track or cam 23 is a continuation of the track 4 so that the blocks 15 will ride upon it from the track 4 as shown in Figure 1. This construction insures the opening of the pocket formed by the blocks 15 and track 4 at the loading end 10 of the track so a shrimp may be easily inserted.

A rotating shrimp deveining saw 25 is positioned within the framework 7 and below the track 4 with its peripheral edge carrying the teeth projecting up through a slot 26 in the track 4 and into the base of the channel 5 in the path of a shrimp moving along the track 4. The deveining saw 25 is rotated by a conventional electric motor 26 which is mounted on the base 8 outside of the deveiner itself, but connected to the saw 25 by shafting which may be uncoupled from the motor when it is desirable to remove the deveiner from the base for cleaning.

Between the plates 7 forming the base, we preferably provide a drawer 27 to catch the sand vein or other material removed from the shrimp.

In operation, the handle 20 is moved clockwise or to the left as shown in Figure 1 until the blocks 15 are lifted away from the track 4 by the cam or second track 23. This provides an opening between the blocks 15 and the track 4 at the shrimp loading end 10. A shrimp is inserted with its back positioned in the channel 5 of the track 4 and beneath the raised blocks 15. The handle 20 is then moved counterclockwise, thus moving the blocks 15 off of the cam 23 and on to the track 4. The blocks 15 are urged against the track 4 by the springs 9 and the grooves 22 in the blocks 15 conform generally to the shrimp, thus holding and moving the shrimp along the track with the blocks 15 as the handle 20 is moving counterclockwise.

As the shrimp 12 is moved across the periphery of the deveining saw 25, the sand vein is removed by the saw and falls into the drawer 27. The slit shrimp is then carried past a scraper 28 fixedly mounted in the channel 5 which extends into the cut made by saw 25. Any pieces of vein or other material loosened by the saw but not completely removed are thereby cleaned from the shrimp during its movement relative to the scraper. As the movement of the shrimp continues along the track 4, it finally reaches the discharge end 11 where it falls from the device.

When it is desired to clean the deveiner, it is merely necessary to remove the drawer 27, manipulate the pins 9, detaching the base 7 from the base plate 8. The deveiner may then be placed in a pan of water for cleaning.

The whole device may be easily and quickly disassembled, since the frame 1 is fastened to the track 4 by the bolts 6 and the track 4 may be removed from its base 7 in the same way.

From the above, it is apparent that we have provided a shrimp deveiner which is extremely simple in construction and operation and wherein the operator runs no danger of cutting his fingers with the deveining saw, since the shrimp are inserted in the device at a point remote from the deveining saw and the manual manipulation of the handle 20 for feeding the shrimp along the track does not endanger the fingers of the operator. The device may be easily disassembled for cleaning and occasional repairing. The device is inexpensive to construct yet quickly and rapidly deveins as many shrimp as desired without the necessity of complicated and expensive machinery.

It is to be understood that modifications may be made in our invention without departing from the spirit thereof, and we do not intend to limit ourselves otherwise than as pointed out in the claims which follow.

Having thus described our invention, what we claim as new and desire to secure by Letters Patent is:

1. A shrimp deveiner including a channeled shrimp receiving track having an open shrimp loading end and an open shrimp discharging end, means for moving a shrimp along said track comprising a plurality of blocks movable along and resiliently urged against said track, a plurality of grooves in the face of said blocks so as to form a shrimp receiving pocket in conjunction with said track, deveining means, the edge thereof projecting into said track in the path of the moving shrimp and means for lifting said blocks from said track at the shrimp loading end thereof.

2. A shrimp deveiner including a channeled shrimp receiving track having an open shrimp loading end and an open shrimp discharging end, a shrimp carrier for moving a shrimp along said track comprising a plurality of blocks movable along and resiliently urged against said track, the faces of said blocks being grooved so as to form a shrimp receiving pocket in conjunction with said track, deveining members projecting into said track in the path of the moving shrimp, means for lifting said blocks from said track defining an arc of a circle, and a plate pivoted at the center of said circle upon which plate the blocks are mounted for oscillatory movement to and fro along said track past the deveining members.

3. A shrimp deveiner including a channeled shrimp receiving track having an open shrimp loading end and an open shrimp discharging end, means for carrying a shrimp along said track comprising a plurality of traveling blocks movable along and resiliently urged against said track, a plurality of grooves in the faces of said blocks forming in conjunction with said track a shrimp receiving pocket, a deveining device, the edge thereof projecting into said track and in the path of the moving shrimp and means for lifting said blocks from said track at the shrimp loading end thereof, including a second track spaced above the loading end of said shrimp receiving track against which the faces of said blocks comprising the shrimp carrier are resiliently engaged.

4. A shrimp deveiner including a channeled shrimp receiving track having an open shrimp loading end and an open shrimp discharging end, a shrimp carrier for moving a shrimp along said track comprising a plurality of blocks movable along and resilient urged against said track, the faces of said blocks forming in conjunction with the track a shrimp receiving pocket, a rotating deveining saw the periphery of which projects into said track in the path of the moving shrimp and means for lifting said blocks from said track at the shrimp loading end thereof, comprising a second track spaced above the loading end of said shrimp receiving track against which the faces of said blocks are resiliently engaged, said second track comprising a portion of a frame embracing said shrimp receiving track and providing a mounting for a movable plate on which said blocks are mounted for movement over said tracks.

5. A shrimp deveiner including spaced arcuate frames, a pivot shaft supported therebetween, a plate within said frames journaled on and radially projecting from said pivot shaft and terminating in an arcuate edge, a shrimp carrier mounted thereon, a channeled arcuate shrimp receiving track embraced within a portion of the periphery of said arcuate frames over which said shrimp carrier moves, a supporting frame mounting said track and said arcuate frames, a rotatable deveining saw carried thereby the periphery of which projects up into the shrimp receiving track, and means for rotating said plate so as to move said carrier over said track and feed a shrimp through the periphery of said deveining saw.

6. A shrimp deveiner including spaced arcuate frames, a pivot shaft carried therebetween, a plate within said frames journaled on and radially projecting from said pivot shaft and terminating in an arcuate edge, a spring biased shrimp carrier mounted thereon, a channeled arcuate shrimp receiving track supported within a portion of the periphery of said arcuate frames over which said shrimp carrier moves, a supporting frame mounting said track and said arcuate frames, a rotatable deveining saw carried thereby the periphery of which projects up into the shrimp receiving track, means for rotating said plate so as to move said carrier over said track and feed a shrimp through the periphery of said deveining saw, said shrimp receiving track having an open shrimp loading end and an open shrimp discharging end, and means for moving said spring biased carrier away from said track at the shrimp loading end thereof.

7. A shrimp deveiner including spaced arcuate frames, a pivot shaft supported therebetween, a spring biased shrimp carrier supported thereon for oscillatory movement, a channeled arcuate shrimp receiving track embraced within a portion of the periphery of the arcuate frames over which said shrimp carrier oscillates, a supporting frame mounting said track and said arcuate frames, a rotatable deveining saw carried thereby the periphery of which projects up into the shrimp receiving track, means for oscillating said carrier over said track and feed a shrimp through the periphery of said deveining saw, said shrimp receiving track having an open shrimp loading end and an open shrimp discharging end, and means comprising a cam mounted on said arcuate frames over the loading end of said track for moving said carrier away from said track at its shrimp loading end, said spring biased carrier being normally urged in a radial direction into contact engagement with said track.

8. A shrimp deveiner including spaced arcuate frames, a pivot shaft mounted therebetween, a shrimp carrier mounted on said shaft for to and fro oscillatory movement thereabout, a channeled arcuate shrimp receiving track over which said shrimp carrier oscillates, a support for said track and said arcuate frames, deveining members extending into the shrimp receiving track, and means for oscillating said carrier over said track to advance a shrimp therethrough into passing engagement with the projecting deveining members.

9. A shrimp deveiner including spaced frame members, a movable shrimp carrier supported therebetween for to and fro movement relative thereto, a channeled shrimp receiving track relative to which said shrimp carrier moves to and fro and forming therewith a movable shrimp receiving pocket, a support mounting said track and said frame members, a deveining member the edge of which projects up into the shrimp receiving track, means for moving said plate carrier over said track to feed a shrimp past the projecting edge of said deveining member, means automatically opening said shrimp receiving pocket at one limit of to and fro motion of the carrier for insertion of a shrimp therein, and means automatically discharging the shrimp therefrom at the other limit of to and fro motion of the carrier after it has passed the projecting edge of the deveining member.

10. A shrimp deveiner including spaced frame members, a shrimp carrier supported therebetween for to and fro movement relative thereto, said carrier comprising a mounting plate, a plurality of shrimp engaging blocks telescopically engaged therewith, spring means interposed between the plate and each block normally urging said blocks outwardly relative to the plate, and a plurality of grooves in the shrimp engaging face of each block, a channeled shrimp receiving track over which said shrimp moving blocks ride, a support mounting said track and said frame members, a rotatable deveining saw the periphery of which projects up into the shrimp receiving track and means for moving said plate so as to move said blocks over said track and feed a shrimp through the periphery of said deveining saw, the grooved face of each block conjointly forming in conjunction with said track a shrimp receiving pocket.

11. A shrimp deveiner including spaced frame members, a plate movably supported within said frames, a plurality of shrimp engaging blocks telescopically mounted on said plate for movement into engaging relation with a shrimp, resilient means normally urging said blocks into shrimp engaging position, a plurality of grooves in the shrimp engaging faces of said blocks, a channeled shrimp receiving track over which said shrimp moving blocks ride and forming with the blocks a movable shrimp receiving pocket, a support mounting said track and said frame members, deveining means extending into the shrimp receiving track, means for moving said plate so as to move said blocks and shrimp receiving pocket over said track and feed a shrimp past the projecting deveining means, said shrimp receiving pocket in which a single shrimp is received comprising the track and one or more blocks.

12. A shrimp deveiner including spaced frame members, a channeled shrimp receiving track supported therebetween, a plurality of movable shrimp gripping members supported therebetween and movable as a unit over said track, a plurality of progressively deeper grooves in the shrimp engaging faces of successive gripping members, a traveling pocket for the reception of an individual shrimp formed by the grooves in successive gripping members in conjunction with the channeled track, deveining means projecting up into the shrimp receiving track and means for moving said plurality of gripping members as a unit to move said pocket over said track and feed a shrimp past the projecting deveining means.

13. A shrimp deveiner including a pair of spaced side frames, a shrimp supporting track intermediate the side frames, an expansible and contractible shrimp carrier movable relative to the side frames and track, the carrier and track conjointly forming a shrimp receiving pocket, means contracting the carrier upon movement in one direction relative to the track to open the pocket for the insertion of a shrimp therein, and expanding the carrier upon movement thereof in the opposite direction to close the pocket upon an inserted shrimp, a pair of cleaning members past which the shrimp is moved by the carrier comprising a power driven rotary cleaner and a stationary scraper projecting from the bottom of the track with which the shrimp is sequentially engaged by its movement under influence of the carrier, and means for moving the carrier in first one direction and then the other.

14. In a shrimp deveiner, a frame member, a shrimp supporting track therein, an expansible and contractible shrimp carrier supported by the frame for movement relative to the track, means contracting the carrier as it approaches one end of the track to provide an access opening for the insertion of a shrimp to be deveined, and expanding the carrier as the carrier moves toward the opposite end of the track, a pair of cleaning members projecting from the track into the path of the moving shrimp over which the shrimp is carried by the carrier in moving the shrimp from the receiving end of the track to the discharge end thereof, and means for manually moving the carrier along said track.

FRANK L. SCHNEIDER.
VIRGIL FANCHER.

References Cited in the file of this patent

UNITED STATES PATENTS

| Number | Name | Date |
|---|---|---|
| 2,263,695 | Grayson | Nov. 25, 1941 |
| 2,263,696 | Grayson | Nov. 25, 1941 |
| 2,299,774 | Weems | Oct. 27, 1942 |
| 2,301,729 | Krull | Nov. 10, 1942 |

FOREIGN PATENTS

| Number | Country | Date |
|---|---|---|
| 70,782 | Norway | July 29, 1946 |